US009760161B2

(12) United States Patent
Chen

(10) Patent No.: US 9,760,161 B2

(45) Date of Patent: Sep. 12, 2017

(54) METHOD AND SYSTEM FOR MANAGING POWER SUPPLIES

(71) Applicants: Inventec (Pudong) Technology Corporation, Shanghai (CN); INVENTEC CORPORATION, Taipei (TW)

(72) Inventor: Yung-Ying Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/087,337

(22) Filed: Mar. 31, 2016

(65) Prior Publication Data

US 2017/0147060 A1 May 25, 2017

(30) Foreign Application Priority Data

Nov. 19, 2015 (CN) ........................ 2015 1 08019890

(51) Int. Cl.
*G06F 1/32* (2006.01)
*G06F 1/30* (2006.01)

(52) U.S. Cl.
CPC .............. *G06F 1/3287* (2013.01); *G06F 1/30* (2013.01); *G06F 1/324* (2013.01); *G06F 1/3296* (2013.01)

(58) Field of Classification Search
CPC .................................. G06F 1/30; G06F 1/324
See application file for complete search history.

(56) References Cited

U.S. PATENT DOCUMENTS

2009/0307512 A1* 12/2009 Munjal ..................... G06F 1/30 713/324
2015/0177814 A1* 6/2015 Bailey .................. G06F 1/3234 713/320
2015/0370301 A1* 12/2015 Bolan .................... G06F 1/263 713/322

* cited by examiner

*Primary Examiner* — Albert Wang
(74) *Attorney, Agent, or Firm* — Muncy, Geissler, Olds & Lowe, P.C.

(57) ABSTRACT

A method and a system are applied to manage a plurality of power supplies. In both the method and the system, a board management controller is applied to detect a plurality of power supplies, so as to determine whether the power supplies are normally operated. When the power supplies are operated normally, the board management controller automatically checks whether an automatic power control means is activated. When the automatic power control means is not activated, the board management controller calculates a real-time residual maximum power value according to at least one of the normal-operated power supplies. Then, the board management controller resets a system power supply value of a management engine by the real-time residual maximum power value. Finally, the board management controller orders the complex programmable logic device relieve a thermal protection means, whereby the processor's operating frequency can be maintained at a normal operating frequency.

5 Claims, 6 Drawing Sheets

METHOD AND SYSTEM FOR MANAGING POWER SUPPLIES

BACKGROUND OF INVENTION

1. Field of the Invention

The invention relates to a method and a system for managing power supplies, and more particularly to the method and the system for managing power supplies that can evaluate power provided by power supplies to reset the system power supply value if necessary, further to relieve processor's thermal protection means, and thereby to thoroughly implement residual power of the power supplies.

2. Description of the Prior Art

Generally speaking, in the modern art, when a computer is shut down for one of the power supplies fails, an alert or throttle signal would be issued to a complex programmable logic device (CPLD). The complex programmable logic device would then activate a throttling means to lower the operating frequency of the processor via a thermal protection means (PROCHOT) of the processor, so that the power consumption of the system would be reduced to a lower level.

Referring to FIG. 1, a conventional system for managing power supplies is schematically shown. This conventional system for managing power supplies PA100 includes two power supplies PA1, PA2, a complex programmable logic device PA3 and a processor PA4. In this system, when one of the power supplies PA1, PA2 fails, an alert signal would be generated and forwarded to the complex programmable logic device PA3. Then, the complex programmable logic device PA3 would trigger a throttling means so as to activate the thermal protection means of the processor PA4 to reduce power consumption by lowering the operating frequency. Also, thereby, the processor PA4 can be protected from overheating. However, though such a design may protect the processor PA4 from heat damage, yet total performance of the computer system would be downgraded as well due to the reduced operating frequency of the processor PA4. In addition, the performance of the normal-operated power supplies PA1 or PA2 would be substantially limited.

SUMMARY OF THE INVENTION

In viewing the prior art, when the power supplies operate abnormally, the conventional system for managing power supplies is to lower the frequency of the processor so as to save power. However, such a resort would also reduce the performance of the processor, and thus the normal-operated power supplies would be affected as well.

Accordingly, it is the primary object of the present invention to provide a method for managing power supplies and a system for managing power supplies that introduce a board management controller to monitor operational states of the power supplies, to calculate the residual power that the normal-operated power supplies can supply, and then to reset the power required for normally operating the system.

In the present invention, the method for managing power supplies is applied to a system for managing power supplies, and includes a plurality of power supplies, a complex programmable logic device (CPLD), a processor, a board management controller and a management engine (ME). The processor further has a thermal protection means for lowering an operating frequency of the processor. A system power supply value of the management engine is preset as a rated power value. The method for managing power supplies comprises the steps of: (a) applying the board management controller to detect states of the power supplies; (b) determining whether the power supplies are normally operated; (c) if at least one of the power supplies fails and at least one thereof is normally operated, checking further if an automatic power control means is activated; (d) if the automatic power control means is not activated, calculating a real-time residual maximum power value according to the normal-operated power supply; (e) resetting the system power supply value of the management engine according to the real-time residual maximum power value and the rated power supply value; and, (0 ordering the complex programmable logic device to relieve the thermal protection means of the processor so as to have an operating frequency of the processor able to be maintained at normal operating frequency.

In one embodiment of the present invention, after the step (b), a step (b1) is included to confirm if the automatic power control means is activated when all the power supplies operate normally, then to terminate the automatic power control means if the automatic power control means is activated, and to go back to the step (a).

In one embodiment of the present invention, the step (c) further includes a step of going back to the step (a) if all the power supplies fail.

In one embodiment of the present invention, the step (d) further includes a step of terminating the automatic power control means and going back to the step (a) if the automatic power control means is activated.

In the present invention, the system for managing power supplies comprises a plurality of power supplies, a board management controller, a management engine, a complex programmable logic device and a processor. The board management controller electrically coupling the plurality of power supplies is to check states of the plurality of power supplies, to check if an automatic power control means is activated at a time when at least one of the power supplies fails and at least one thereof is normally operated, and to calculate a real-time residual maximum power value according to the normal-operated power supplies if the automatic power control means is not activate. The management engine electrically coupling the board management controller has a system power supply value preset as a rated power value, and is to change the system power supply value from the rated power value to the real-time residual maximum power value while in meeting a situation that at least one power supply fails and at least another one is normally operated and also in meeting that the automatic power control means is not activated. The complex programmable logic device electrically couples the plurality of power supplies and the board management controller. The processor electrically coupling the complex programmable logic device has a thermal protection means for lowering an operating frequency of the processor. In this system, after the management engine sets the system power supply value to be the real-time residual maximum power value, the board management controller orders the complex programmable logic device to relieve the thermal protection means of the processor so as to maintain the operating frequency of the processor at a normal operating frequency.

By providing the system for managing power supplies and the method for managing power supplies, the board management controller is introduced to monitor the operational states of the power supplies, and bases on the real-time residual maximum power value and the rated power value to set the system power supply value. In the case that the rated power value is larger than the real-time residual maximum power value, the real-time residual maximum power value is set to be the system power supply value. In the case that the rated power value is smaller than the real-time residual maximum power value, the rated power value is set to be the system power supply value. Upon such an arrangement, the normal-operated power supplies can be effectively utilized to provide sufficient power to ensure the calculation capacity of the processor and thus to operate the whole system more stably.

All these objects are achieved by the method and the system for managing power supplies described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and a system for managing power supplies. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
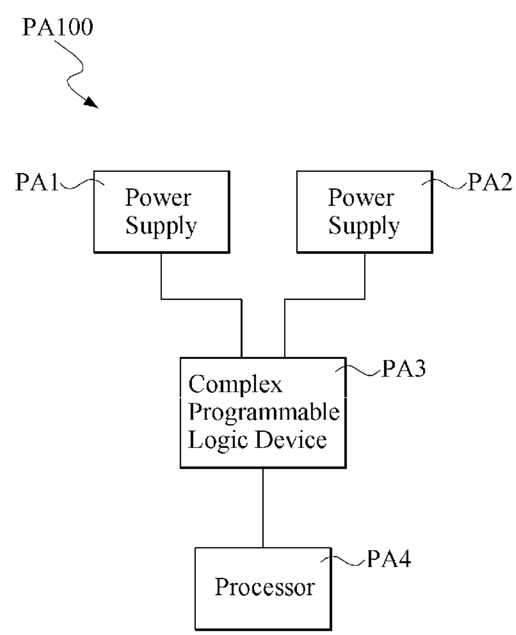
FIG. 1 is a schematic view of a conventional system for managing power supplies.
Figure 2:
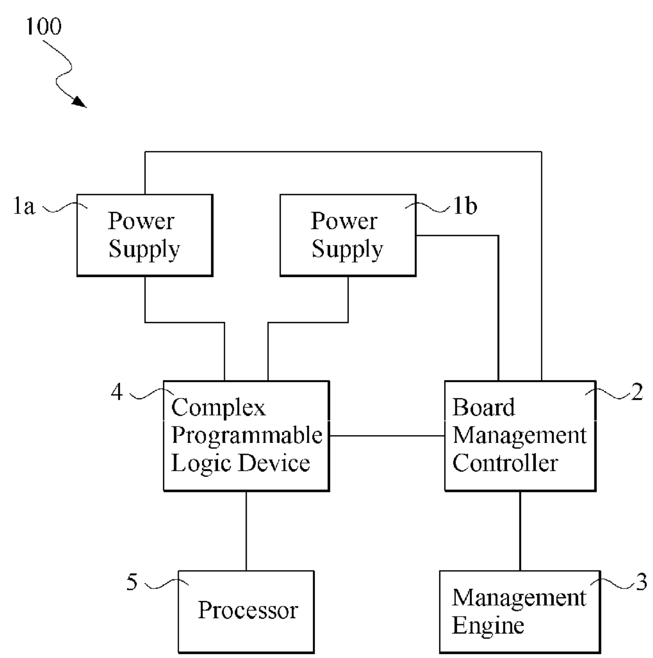
FIG. 2 is a schematic view of a preferred system for managing power supplies in accordance with the present invention.

Referring now to FIG. 2, a schematic view of a preferred system for managing power supplies in accordance with the present invention is shown. The system for managing power supplies 100 includes two power supplies 1*a* and 1*b*, a board management controller 2, a management engine 3, a complex programmable logic device 4 and a processor 5.

The power supplies 1*a* and 1*b* is to provide the power.

The board management controller 2 electrically coupling the power supplies 1*a* and 1*b* is to check the states of the power supplies 1*a* and 1*b*, and to check if an automatic power control means is activated while in meeting a situation that at least one of the power supplies 1*a* and 1*b* fails but another one is normally operated. If the automatic power control means is not activated, a real-time residual maximum power value would be evaluated upon the power supply 1*a* or 1*b* in normal-operated state.

The management engine 3 electrically coupling the board management controller 2 has a system power supply value preset as a rated power value. The management engine 3 is to change the system power supply value from the rated power value to a real-time residual maximum power value, while in meeting the situation that at least one power supply fails but at least another one is normally operated and also the situation that the automatic power control means is not activated.

The complex programmable logic device 4 is electrically coupled with the power supplies 1*a* and 1*b* and the board management controller 2.

The processor 5 electrically coupling the complex programmable logic device 4 has a thermal protection means for lowering the operating frequency of the processor 5. After the management engine 3 resets the system power supply value to be the real-time residual maximum power value, then the board management controller 2 would order the complex programmable logic device 4 to relieve the thermal protection means of the processor 5, such that the operating frequency of the processor 5 can be maintained at a normal operating frequency.

Figure 3:
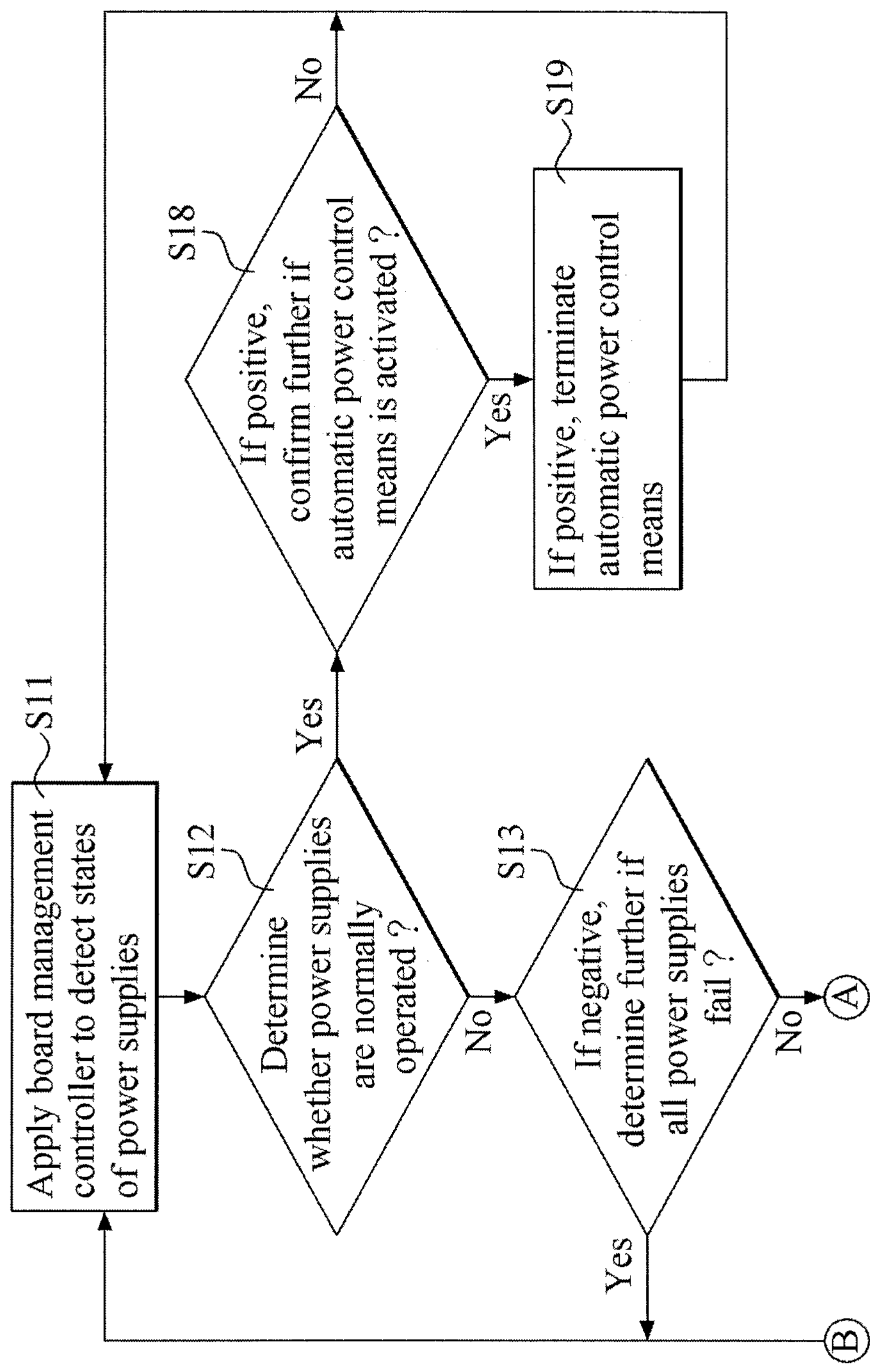
FIG. 3 together with FIG. 3A show a flowchart of a preferred method for managing power supplies in accordance with the present invention.
Figure 3A:
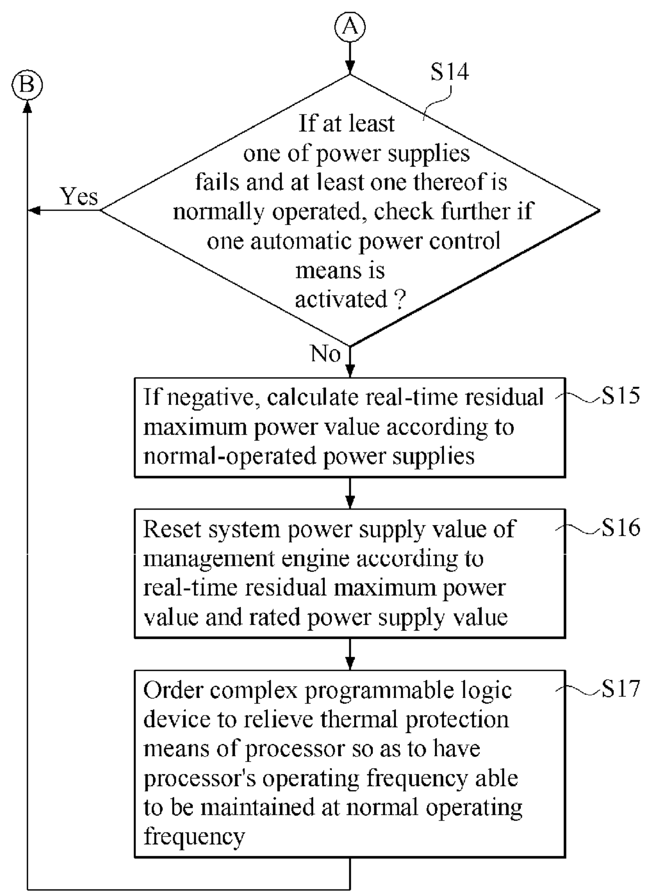

Referring now to FIG. 3 and FIG. 3A, a flowchart of the method for managing power supplies in accordance with the present invention is shown. The method for managing power supplies, applied to the aforesaid system for managing power supplies 100, includes the following steps. Firstly, in Step S11, the board management controller 2 is applied to detect the states of the power supplies 1*a* and 1*b*. then, in Step S12, the power supplies 1*a* and 1*b* is determined to be normally operated or not. As one (not necessary both) of the power supplies 1*a* and 1*b* fails, the combination of the power supplies 1*a* and 1*b* is deemed to be in a state of abnormal operation.

In Step S13, when the combination of the power supplies 1*a* and 1*b* is judged to be abnormally operated, a further check is performed to determine if both of the power supplies 1*a* and 1*b* fail. In addition, in Step 18, as both of the power supplies 1*a* and 1*b* normally operate, a check would be performed to determine if the automatic power control means is activated or not. In the case that the automatic power control means is not activated, then go back to Step S11. In Step S19, as the automatic power control means is already activated, then terminate the operation of the automatic power control means and go back to Step S11.

Then, in Step S14, if at least one of power supplies 1*a* and 1*b* fails and at least one thereof is normally operated, then check further if the automatic power control means is activated. In the case that the automatic power control means is activated, then terminate the automatic power control means and go back to Step S11.

Further, in Step S15, If the automatic power control means is not activated, then calculate a real-time residual maximum power value according to the normal-operated power supply 1*a* or 1*b*.

Further, in Step S16, reset the system power supply value of the management engine 3 according to the real-time residual maximum power value and the rated power value.

Finally, in Step S17, order the complex programmable logic device 4 to relieve thermal protection means of processor 5 so as to have processor's operating frequency able to be maintained at a normal operating frequency.

Figure 4:
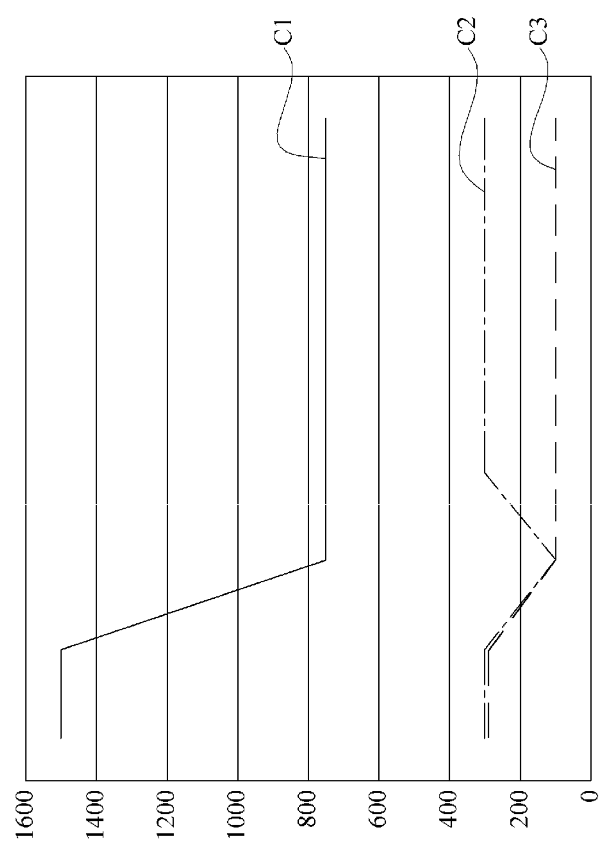
FIG. 4 illustrates power variations for a practical example in accordance with the present invention.

Referring now to FIG. 4, power variations for a practical example in accordance with the present invention are plotted. As shown, the curve C1 demonstrates the variation of the residual maximum power values, the curve C2 is the varying curve for the rated power value in the art, and the curve C3 is the varying curve for the rated power value in accordance with the present invention. As shown in the following table, the system power supply value as the rated power value is preset to be 300 w, and the power of each of the power supplies 1*a* and 1*b* is 750 w. When both of the power supplies 1*a* and 1*b* are normally operated, the real-time residual maximum power value is 1500 w. However, if one of the power supplies 1*a* and 1*b* fails and another is normally operated, the real-time residual maximum power value is 750 w. At this instance, the rated power value in the art would be reduced to 100 w since the thermal protection means of the processor PA4 is activated to lower the operating frequency and power consumption. On the other hand, in the present invention, the board management controller 2 would base on the real-time residual maximum power value (750 w) and the preset rated power value (300 w) to reset the system power supply value of the management engine 3 to be 300 w, and to relieve the thermal protection means of the processor 5 so as to maintain the processor 5 to be normally operated without reducing the operating frequency.

TABLE 1

| Rated power value v.s. Real-time residual maximum power value | | | |
|---|---|---|---|
| System power supply value in the art (w) | System power supply value of the present invention (w) | Real-time residual maximum power value (w) | State of the power supplies |
| 300 | 300 | 1500 | |
| 100 | 100 | 750 | One of the two power supplies fails |
| 100 | 300 | 750 | |

Figure 5:
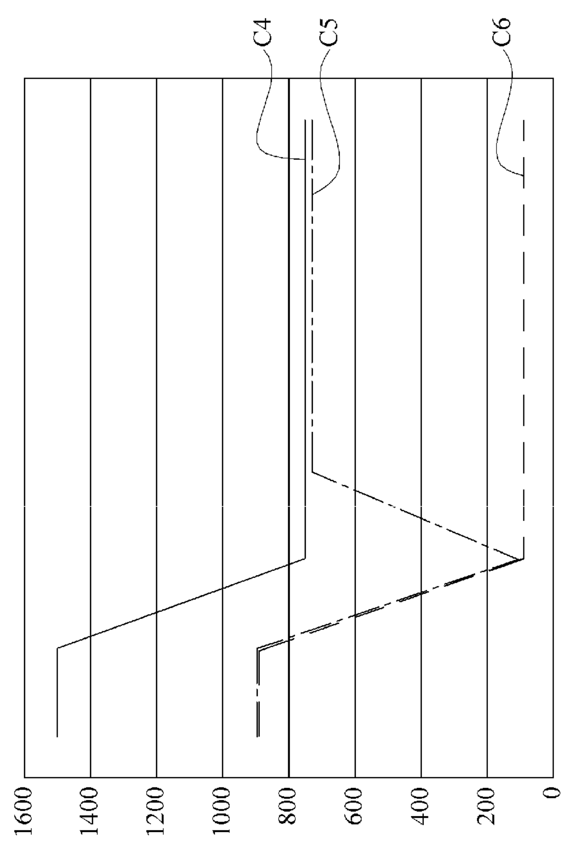
FIG. 5 illustrates power variations for another practical example in accordance with the present invention.

Referring now to FIG. 5, power variations for another practical example in accordance with the present invention are plotted. As shown, the curve C4 is the varying curve of the residual maximum power value, the curve C6 is the varying curve of the rated power value in the art, and the curve C5 is the varying curve of the rated power value of the present invention. As shown in Table 2, the system power supply value as the rated power value is preset to be 900 w, and the power of each of the power supplies 1*a* and 1*b* is 750 w. When both of the power supplies 1*a* and 1*b* are normally operated, the real-time residual maximum power value is 1500 w. However, if one of the power supplies 1*a* and 1*b* fails and another is normally operated, the real-time residual maximum power value is 750 w. At this instance, the rated power value in the art would be reduced to 100 w since the thermal protection means of the processor PA4 is activated to lower the operating frequency and power consumption. On the other hand, in the present invention, the board management controller 2 would base on the real-time residual maximum power value (750 w) and the preset rated power value (900 w) to reset the system power supply value of the management engine 3 to be 900 w, and to relieve the thermal protection means of the processor 5 so as to maintain the processor 5 to be normally operated without reducing the operating frequency.

TABLE 2

| Rated power value v.s. Real-time residual maximum power value | | | |
|---|---|---|---|
| System power supply value in the art (w) | System power supply value of the present invention (w) | real-time residual maximum power value (w) | State of the power supplies |
| 900 | 900 | 1500 | |
| 100 | 100 | 750 | One of the two power supplies fails |
| 100 | 750 | 750 | |

In summary, by comparing to the conventional system for managing power supplies, the system for managing power supplies and the method for managing power supplies in accordance with the present invention introduce the board management controller to detect the states of the power supplies, and base on the real-time residual maximum power value as well as the rated power value to reset the system power supply value. When the rated power value is larger than the real-time residual maximum power value, the real-time residual maximum power value would be then reset as the system power supply value. On the other hand, when the rated power value is smaller than the real-time residual maximum power value, the rated power value can be set as the system power supply value. Upon such an arrangement, when one of plural power supplies fails, no frequency-lowering of the processor is needed. In accordance with the present invention, the system for managing power supplies and the method for managing power supplies would maintain the processor to operate within a fixed range of operating frequency, so that normal power supply would be maintained, the calculation performance of the processor won't be sacrificed anyway, and the system can be operated constantly.

While the present invention has been particularly shown and described with reference to a preferred embodiment, it will be understood by those skilled in the art that various changes in form and detail may be without departing from the spirit and scope of the present invention.

What is claimed is:

1. A method for managing power supplies, applied to a system for managing power supplies, the system for managing power supplies including a plurality of power supplies, a complex programmable logic device (CPLD), a processor, a board management controller and a management engine (ME), the processor further having a thermal protection means for lowering an operating frequency of the processor, a system power supply value of the management engine being preset as a rated power value, the method for managing power supplies comprising the steps of:

(a) applying the board management controller to detect states of the power supplies;

(b) determining whether the power supplies are normally operated;

(c) if at least one of the power supplies fails and at least one thereof is normally operated, checking further if an automatic power control means is activated;

(d) if the automatic power control means is not activated, calculating a real-time residual maximum power value according to the normal-operated power supply;

(e) resetting the system power supply value of the management engine according to the real-time residual maximum power value and the rated power supply value; and (f) ordering the complex programmable logic device to relieve the thermal protection means of the processor so as to have an operating frequency of the processor able to be maintained at normal operating frequency.

2. The method for managing power supplies of claim 1, wherein, after the step (b), a step (b1) is included to confirm if the automatic power control means is activated when all the power supplies operate normally, then to terminate the automatic power control means if the automatic power control means is activated, and to go back to the step (a).

3. The method for managing power supplies of claim 1, wherein the step (c) further includes a step of going back to the step (a) if all the power supplies fail.

4. The method for managing power supplies of claim 1, wherein the step (d) further includes a step of terminating the automatic power control means and going back to the step (a) if the automatic power control means is activated.

5. A system for managing power supplies, comprising:

a plurality of power supplies;

a board management controller, electrically coupling the plurality of power supplies, being to check states of the plurality of power supplies, checking if an automatic power control means is activated at a time when at least one of the power supplies fails and at least one thereof is normally operated, calculating a real-time residual maximum power value according to the normal-operated power supplies if the automatic power control means is not activated;

a management engine, electrically coupling the board management controller, having a system power supply value preset as a rated power value, changing the system power supply value from the rated power value to the real-time residual maximum power value while in meeting a situation that at least one power supply fails and at least another one is normally operated and also in meeting that the automatic power control means is not activated;

a complex programmable logic device, electrically coupling the plurality of power supplies and the board management controller; and a processor, electrically coupling the complex programmable logic device, having a thermal protection means for lowering an operating frequency of the processor;

wherein, after the management engine sets the system power supply value to be the real-time residual maximum power value, the board management controller orders the complex programmable logic device to relieve the thermal protection means of the processor so as to maintain the operating frequency of the processor at a normal operating frequency.

* * * * *